United States Patent [19]

Mayer

[11] 4,384,784
[45] May 24, 1983

[54] ELECTROPHOTOGRAPHIC COPYING APPARATUS AND SUBSYSTEMS THEREFOR

[75] Inventor: Edward F. Mayer, San Jose, Calif.

[73] Assignee: Ricoh Company, Ltd., Tokyo, Japan

[21] Appl. No.: 199,096

[22] Filed: Oct. 20, 1980

[51] Int. Cl.³ .................... G03G 15/00; G03B 27/34; G03G 15/28

[52] U.S. Cl. .................................... 355/8; 355/14 R; 355/55; 355/56

[58] Field of Search .................. 355/8, 14 R, 55, 56, 355/57

[56] References Cited

U.S. PATENT DOCUMENTS

| | | | |
|---|---|---|---|
| 3,591,277 | 7/1971 | Gardner | 355/8 |
| 3,736,055 | 5/1973 | Davidge et al. | 355/14 R |
| 3,918,805 | 11/1975 | Limberger et al. | 355/8 |
| 4,093,374 | 6/1978 | Zucker et al. | 355/57 |
| 4,124,288 | 11/1978 | Zeuthen | 355/8 |

Primary Examiner—A. C. Prescott
Attorney, Agent, or Firm—Guy W. Shoup; Gerard F. Dunne

[57] ABSTRACT

An electrophotographic copying apparatus includes a photosensitive surface capable of retaining an electrostatic latent image for at least two cycles of the surface so a first copy of an original can be made upon scanning the original and the latent image can be recycled to produce a second copy of the same original during the return of the scanning mechanism. The apparatus includes an improved mechanism for driving the scanning mechanism, as well as improved developing and transfer stations. The improved scanning mechanism includes a movable carriage having a vertical slotway. A pin is held within the slotway and driven by a flexible cable to travel in an endless path to move the carriage back and forth beneath the original. The carriage may include a second slotway for holding a second pin driven by a flexible cable arranged in an endless path extending a distance longer than the first mentioned path. Either of these pins may be engaged to its slotway to vary the length of travel of the carriage.

1 Claim, 7 Drawing Figures

ELECTROPHOTOGRAPHIC COPYING APPARATUS AND SUBSYSTEMS THEREFOR

The present invention relates to electrophotographic copying apparatus and, more particularly, to such apparatus useful in making multiple copies of the same original.

Electrophotographic copying apparatus typically include a photosensitive surface movable cyclically past a plurality of processing stations. Typically, charged portions of the photosensitive surface are exposed to a light image produced by scanning with light the original to be copied. An electrostatic latent image conforming with the original can thus be formed on the photosensitive surface, and this latent image can be developed by applying appropriate developer making the latent image visible. This visible image can then be transferred to a copy sheet.

The number of copies that can be produced in a given time period of such a copying apparatus is often limited by the speed of the mechanism scanning the original with light, particularly when more than one copy is to be made of the same original. Typically, this scanning mechanism includes a carriage carrying a light source and necessary optical accessories, and it must be moved along the original synchronously with movement of the photosensitive surface. The carriage must then be returned to its initial position before another cycle can begin, and the time needed for return of the carriage often delays the beginning of the next cycle for producing a copy.

It has been proposed, for example in U.S. Pat. No. 3,736,055, to increase the throughput of a copying apparatus by forming a latent electrostatic image that can be preserved for at least two cycles of the photosensitive member. In this way, the first copy of an original can be made upon scanning the original, and the latent image on the photosensitive surface can be re-cycled to produce another copy of the same original during the return period of the scanning mechanism.

In order to take full advantage of such a procedure, however, it is desirable to reduce the time for each cycle of the photosensitive member by increasing the efficiency of the various processing stations. It is also necessary to transfer the visible image from the photosensitive member in a gentle manner which will not disturb the latent electrostatic image.

According to the present invention, these objects can be met by an electrophotographic copying apparatus including a photosensitive surface movable cyclically past a plurality of processing stations. The photosensitive surface is of the type capable of retaining for at least two of its cycles an electrostatic latent image formed by exposing charged portions of the surface to a light image of the original to be copied.

The means for scanning the original with light synchronously with movement of the photosensitive surface preferably includes a carriage mounted slidably within the copying apparatus and having a slotway extending vertically. A pin is held within the slotway and a flexible cable held to this pin is arranged in an endless path extending along the location of the original. In this way, movement of the cable can move the carriage along the original for scanning during one cycle of the photosensitive surface for forming a copy and reverse the direction of the carriage in an exceptionally smooth manner to return it to its initial position during formation of another copy of the original in the next cycle of the photosensitive surface.

The carriage may also include a second slotway for holding a second pin held to a second cable arranged in a second endless path extending along the original a distance longer than the first mentioned cable. Means are also provided for selectively engaging either the first mentioned pin or the second pin in its respective slotway for changing the speed and length of travel of the scanning means for producing a reduced size copy from a larger original.

The developing station of the copying apparatus is capable of applying sufficient developing powder to the latent image even though the photosensitive member may be moving at a higher than standard speed, and preferably includes two magnetic brushes of developing powder. The magnetic brushes are adapted to rotate oppositely for wiping the latent image in one direction and then the other with the developer powder. Preferably, the first magnetic brush to engage the photosensitive surface rotates to wipe the surface in a direction opposite to the movement of the surface, and the other magnetic brush rotates to wipe the surface in the same direction as its movement. In this way, the first magnetic brush will be quite effective in depositing developing powder to the latent image, even though it may tend to abrade powder from the leading edge of the image. Any adverse effects of this abrading of the leading edge, however, will be reduced by the second magnetic brush rotating in the opposite direction. The second magnetic brush may be formed with a magnetic field lower in strength than the magnetic field forming the first magnetic brush so as not to unduely disturb the development of the latent image by the first magnetic brush.

The apparatus may also include improved means for removing excess developing powder from the photosensitive surface. These means may include an elongate magnetic element having its poles formed on opposite longitudinal sides. The magnetic element is movable between a position placing one of its ends adjacent the photosensitive surface for attracting excess developing powder and a more horizontal position placing the other end of the magnetic element into contact with a magnetic shunt. In this way, the magnetic field strength at the end holding the excess developing powder can be reduced to release the developing powder to a collecting area by moving the magnetic element to its more horizontal position. The magnetic element is preferably formed of a magnetic core material having pole faces held to longitudinal sides thereof. These pole faces extend beyond the core material at the end adjacent the photosensitive surface to increase the magnetic field at this end. A non-magnetic filler material is preferably held between the extended portions of the pole faces to provide a smooth surface for holding the developing powder.

The transfer station should be capable of bringing a copy sheet into contact with the visible powder image formed on the photosensitive surface, and then remove the copy sheet carrying the powder image in such a manner so as not to unduly disturb the electrostatic latent image.

According to an important feature of the present invention, the transfer station includes a roller adapted to rotate adjacent the photosensitive surface in synchronism therewith. The roller includes holes, preferably no more than $\frac{1}{8}$ in. in diameter, which extend inwardly to pressure means forming a low pressure on the surface of the roller for holding a copy sheet thereto to bring it into contact with the powder image and latter forming a higher pressure on the roller surface for releasing the copy sheet.

The pressure means may be provided in any of several ways and, for example, may include a first chamber connectible to a source of low pressure and formed interiorly of the roller to extend beneath the path of travel of a copy sheet held thereby, and a second chamber located adjacent the downstream end of the chamber and connectible to a source of higher pressure.

Alternatively, the pressure means may include an inner wall held along the inner surface of the outer wall of the roller, and a cam follower held to this inner wall. The cam follower extends to a cam surface operable to move the cam follower away from the outer wall of the roller when the copy sheet registers with the holes in the roller. The space between the inner wall and outer roller wall is thus increased to create the low pressure, and the cam surface later allows the cam follower to move back towards the outer roller wall to decrease the space to create the higher pressure. The cam surface may also be configured to increase the space forming the low pressure as the copy sheet is transported by the roller and, in this way, the low pressure would be maintained even if some air should leak through or around the copy sheet.

The inner wall preferably is formed of a resilient material and has one end held to the outer roller wall. The cam follower is held to the other end of the inner wall and an extensible member is included to close the compartment formed by the inner wall and outer roller wall.

In either of the above forms for the pressure means, the roller is preferably formed of a material having a resistivity of between $10^6 \Omega cm$ and $10^{10} \Omega cm$, and means are provided to apply a potential to the roller to assist transfer of the developing powder to the copy sheet.

These and other objects, features and advantages of the present invention will become further apparent in view of the following description of illustrated embodiments thereof taken in conjunction with the accompanying drawings, in which.

Figure 5:
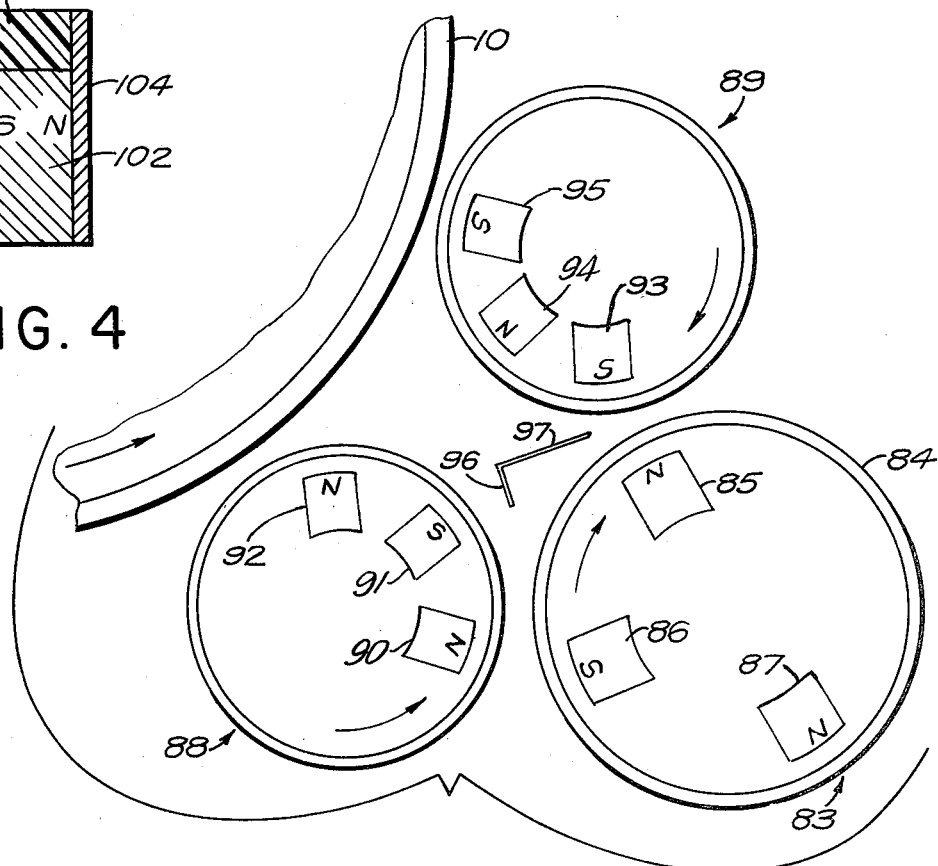
Figure 6:
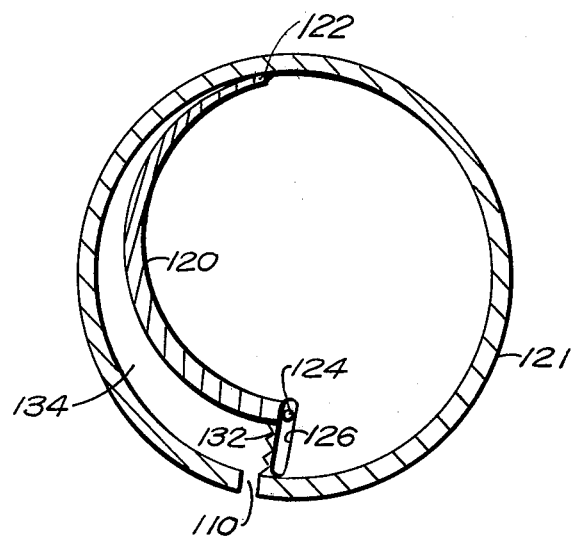
Figure 7:
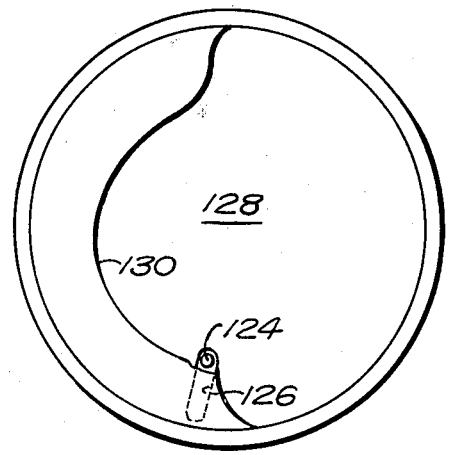

FIG. 5 diagrammatically illustrates the structures forming the magnetic developing brushes of the present invention;

FIG. 6 illustrates diagrammatically the cross-section of another embodiment of the transfer roller; and FIG. 7 illustrates the end portion of the roller of FIG. 6.

Figure 1:
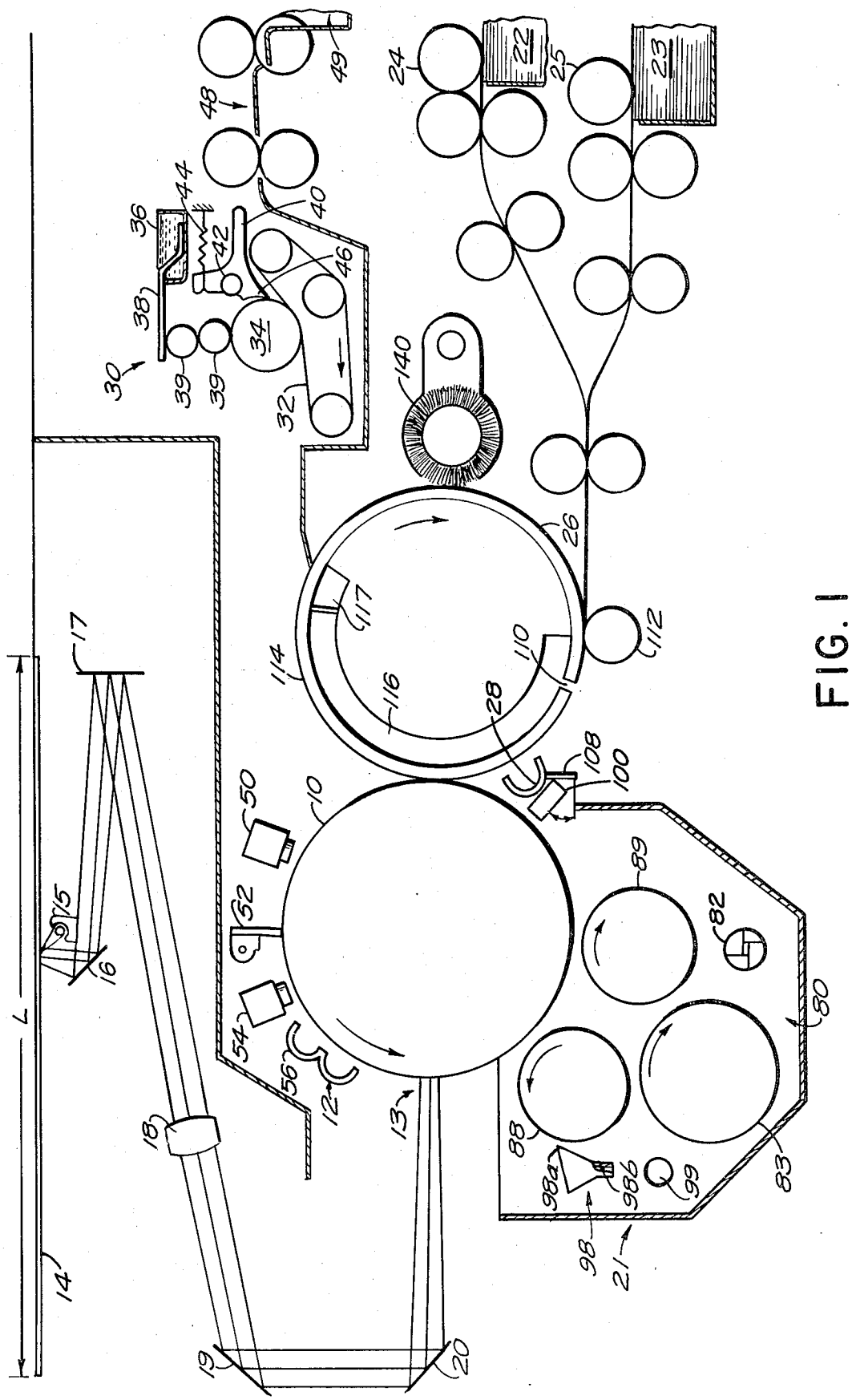
FIG. 1 illustrates diagrammatically a copying apparatus embodying the present invention.

The apparatus illustrated in FIG. 1 includes a drum 10 having a conductive shell provided with a surface of a selenium compound of other appropriate photosensitive material. The drum 10 rotates in the direction shown for bringing the photoconductive surface past a charging unit 12 providing a high voltage to the photoconductive surface to charge selected portions thereof.

The charged portions of the photoconductive surface are brought past an exposure station 13 where a light image of an original is projected onto the moving drum to discharge portions of the charged photoconductive surface and thus form an electrostatic latent image conforming to the original. The light image is formed by scanning with light an original place on the glass platen 14. A light source, such as a halogen lamp 15, is moved with a first mirror 16 along the original synchronously with movement of the drum. The light from the light source is reflected from the original, onto the first mirror 16 and to a second mirror 17 which follows the movement of the first mirror, but at a reduced speed. The light reflected from the second mirror 17 passes through the lens 18 and is reflected by mirrors 19 and 20 onto the moving drum.

The electrostatic latent image thus formed on the charged portions of the photosensitive surface is then brought to a developing station 21 where toner material is charged to a polarity opposite that of the latent image and made to adhere to the latent image to form a visible powder image of the original.

The apparatus illustrated in FIG. 1 includes trays 22 and 23 holding copy sheet of different lengths. A feed roller 24 or 25 of the appropriate tray is rotated to feed a copy sheet along its path of travel to a transfer roller 26. The transfer roller 26 grasps the copy sheet in a manner to be described more fully below and brings it past a charger 28 applying a charge to the copy sheet to attract the toner material forming the visible powder image on the photoconductive surface. The copy sheet is then brought into register with the visible powder image to lift the powder image off the photoconductive surface and carry it to a fuser station 30.

The fuser station 30 preferably includes an endless transport belt 32 which receives the copy sheet carrying the powder image and brings it into pressure contact with a heater roll 34. The heater roll 34 is lubricated with silicone oil or the like from the tank 36 by wick 38 and lubricant transfer rollers 39. The heater roll 34 supplies sufficient heat to fuse the powder image to the copy sheet during the time the transport belt holds the copy sheet against the heater roll. The transport belt 32 extends partially around the circumference of the heater roll 34 and thus holds the copy sheet in contact therewith for an appropriate time period to reduce the amount of heat that must be generated by the heater roll to fuse the powder image satisfactorily to the copy sheet.

A pick-up device 40 is mounted pivotally to shaft 42 and biased by tension spring 44 to bear its edge portion 46 against the heater roll 34. The copy sheet emerging from under the heater roll is thus directed through a copy sheet path 48 to a receiving tray 49.

After transfer of the powder image from the drum 10 to a copy sheet, the charged portions of the photoconductive surface are rotated past a cleaning station which includes a lamp 50 which may be actuated for dissipating the charges on the photoconductive surface holding any residual developing powder and an elastomeric cleaning blade 52 rotatable into contact with the photoconductive surface to wipe away any such residual developing powder. The photosensitive surface is then rotated passed a quenching lamp 54 and neutralizing charger 56 activated to assure no residual charge remains on the photoconductive surface prior to re-charging by the charging unit 12 in preparation for the formation of a new electrostatic latent image.

The circumference of the drum 10 is slightly larger than the length L of travel for scanning of an original of the maximum size normally expected for the particular apparatus, for example, the drum may be 2 cm larger than B-4 copy sheets. The drum 10 therefore makes nearly one complete revolution during the scanning of the original.

The scanning mechanism must, however, be returned to its initial position before another electrostatic latent image can be formed on the drum and, consequently, the time needed for return of the scanning mechanism often delayed the formation of the next copy in many conventional machines, particularly when multiple copies were to be made of the same original.

In an apparatus according to the present invention, the photoconductive surface is formed of a material capable of retaining a usable electrostatic latent image for at least two complete revolutions of the drum 10. Typically, such materials include arsenic-selenium compounds such as $As_2Se_3$ which permit a first copy of an original to be made upon scanning the original, and the drum 10 can make another revolution to produce another copy during the return of the scanning mechanism.

In order to take full advantage of the increased throughput offered by such a copying apparatus, it is desirable to increase the efficiency of the various components so they may perform at a higher speed.

Figure 2:
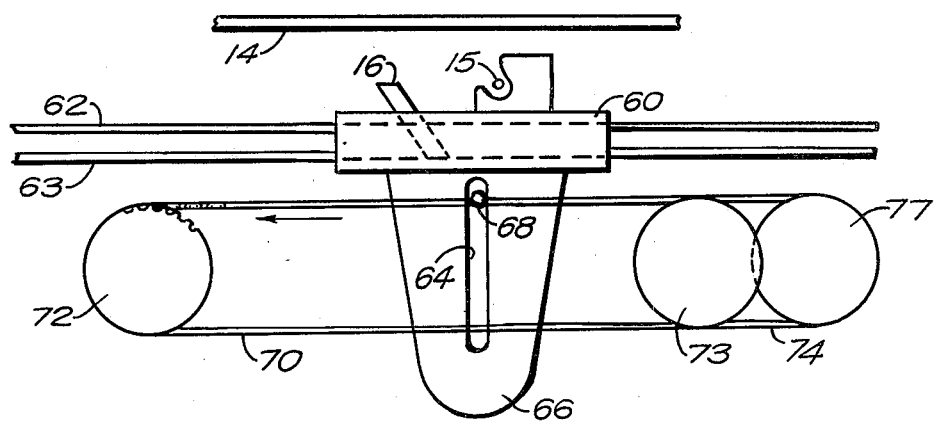
FIG. 2 illustrates diagrammatically the drive for the scanning mechanism of the present invention.
Figure 3:
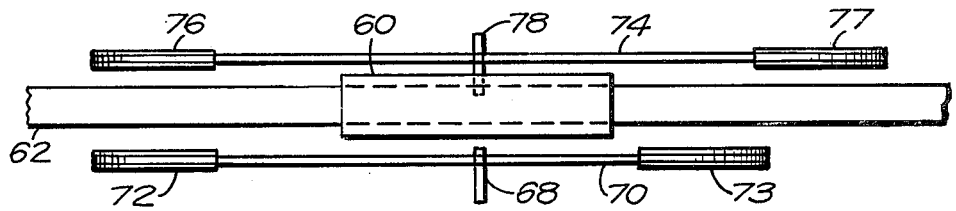
FIG. 3 is a top plan view of the drive of FIG. 2.

FIGS. 2 and 3 illustrates diagrammatically the structures for driving the scanning mechanism of the present invention. As shown in FIG. 2, a carriage 60 carrying the light source 15 and first mirror 16 is mounted for slidable movement along guides 62 and 63. The carriage 60 has a slotway 64 extending vertically in a depending flange portion 66 of the carriage. A pin 68 is extended within the slotway 64 and is held to a flexible cable 70 arranged in an endless path extending along the glass platen 14. The cable 70 is preferably formed by a chain extending around pulleys 72 and 73, one of which is a drive pulley, having suitable sprockets engaging the chain.

Rotation of the drive pulley at a constant speed moves the carriage horizontally along the platen 14 at a uniform speed. As the pin 68 turns around the pulley 72, the carriage decelerates at an even rate and then accelerates evenly in the reverse direction to provide an exceptionally smooth transition from one direction of movement to the other. The carriage then travels horizontally while the lamp 15 is de-energized. Upon reaching pully 73, the carriage again decelerates and accelerates smoothly to be in position to begin another scan of the original on platen 14.

The carriage is thus driven at a uniform speed during scanning of the original, and the forward and return movement of of the carriage occur in equal time periods. The scanning of the original can thus be made in synchronism with a revolution of the drum, and return of the carriage can be made during the next drum revolution. Further, the carriage can be driven at a relatively high speed without encountering uneven acceleration of deceleration which often causes undue vibration and shock in typical clutch actuated reversing mechanisms.

Additionally, a further cable may be provided for allowing copies to be made from large originals, such as those having the size DIN A-3. As shown in FIG. 3, a second cable 74 extends in an endless path parallel to, but larger than, the path of cable 70. Cable 74 extends around pulleys 76 and 77 and has a pin 78 held thereto. Pin 78 is engageable in the slotway 64 of the carriage. The pins 68 and 78 are connected to suitable control structures so that one or the other of these pins is positioned within the slotway 64. Any suitable control structures may be used and preferably pins 68 and 78 are interconnected by a suitable link pivoted by a solenoid or the like to position one pin in slotway 64 while withdrawing the other.

Consequently, one cable or the other may be selected to drive the carriage 60 in order to change its length of travel and speed. Cable 70 typically is set at a speed equal to the speed of movement of the surface of drum 10 and thus originals of a size of, for example, DIN B-4 or A-4 could be copied without any change in size with proper positioning of the lens 18.

Further, unusually large originals such as DIN A-3 may be reduced to A-4 size copies by re-positioning lens 18 and engaging cable 74 to increase the length of travel of the scanning mechanism. Further, cable 74 may be driven at a speed faster than cable 70 to allow the drum 10 to rotate at the same speed. Further, B-4 originals could be reduced to A-4 copy size by simply re-positioning lens 18 and changing the speed of the drive of cable 70, as would be well understood in the art. Thus, the drive described for the scanning mechanism allows originals to be copied without change in size, or allows reduction copying without having to change the speed of the photoconductor.

The surface of the drum 10 of the apparatus illustrated in FIG. 1 preferably moves at a speed of approximately 275 mm per second and, consequently, the developing of the electrostatic latent image formed on the photoconductive surface must be accomplished quite efficiently. The developing station 21 includes a reservoir 80 of developing powder typically comprised of atoner material and a magnetic carrier. It will be understood, of course, that a one-component developer comprised of magnetically attractable toner material may also be used.

The developing station 21 further includes a stirrer 82 extending across the lower region of the reservoir 80 to mix the developing powder continually to assure uniformity of the mix and facilitate charging of the toner material triboelectrically. As shown in FIGS. 1 and 5 an elevator roller 83 is positioned near the stirrer 82 and includes a non-magnetic sleeve 84 rotating in the direction shown around a plurality of stationary magnets 85, 86 and 87 alternating in outer polarity as shown in FIG. 5.

Situated generally above elevator roller 83 are a pair of developing rollers 88 and 89 each consisting of an outer nonmagnetic sleeve rotating in opposite directions, as shown, about respective stationary magnets. As shown clearly in FIG. 5, developing roller 88 includes magnets 90, 91 and 92 alternating in polarity with magnet 90 closest to elevator roller 83 having a polarity on its outer surface opposite to that of the nearest magnet 86 within the elevator roller 83. Similarly, developing roller 89 includes interior magnets 93, 94 and 95 with magnet 93 being closest to elevator roller 83 and also having on its outer surface a polarity opposite to that of the nearest magnetic 85 within the elevator roller.

Consequently, the rotating sleeve 84 of elevator roller 83 forms on its surface a magnetic brush of developing powder which is transferred to developing roller 88 by the magnetic field formed between magnet 86 of the elevator roller and magnet 90 within the developing roller 88. A doctor blade 96 limits the height of the magnetic brush thus formed on the rotating shell of developing roller 88. Developing powder is similarly transferred to developing roller 89 under the limiting effect of doctor blade 97 due to the magnetic field formed between magnets 93 and 85.

The magnetic brushes formed by the developing roller 88 and 89 rotate oppositely for wiping the photoconductive surface bearing an electrostatic latent image in one direction and then the other. Consequently, the latent image spends a longer time in contact with the developing powder than if only a single magnetic brush were contacting the latent image. As shown in the figures, the magnetic brush formed by developing roller 88 is the first to engage the latent image and rotates in a direction to wipe the latent image in the direction opposite to its movement. The magnetic brush formed by developing roller 88 will thus be quite effective in depositing developing powder on the latent image.

The magnetic brush formed by developing roller 88 may, however, tend to abrade powder deposited on the leading edge of the image. Any adverse effects of this abrading of the leading edge will, however, be reduced by the magnetic brush formed by developing roller 89 moving along with the latent image. In order not to unduly disturb the development of the latent image by the first magnetic brush, the developing roller 89 may have a magnetic field strength reduced from that of the developing roller 88.

In order to monitor the concentration of toner material in the developing powder, a sensor 98 for toner concentration is provided adjacent developing roller 88. The sensor 98 may take any of several known forms, and as illustrated includes a doctor 98a removing developing powder from roller 88 and guiding it through passageway 98b for sensing the concentration of toner by its inductance, resistance or light absorbing properties, as is well known. Should any toner material be needed, it can be supplied automatically through opening 99.

Figure 4:
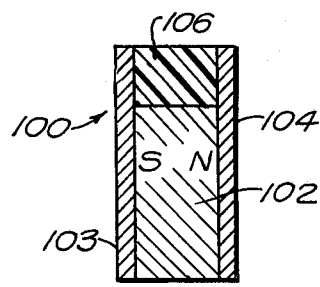
FIG. 4 is an enlarged view of the magnetic element used for removing excess developer.

At the downstream end of the developing station 21 is positioned an elongate magnetic element 100 extending across the width of the image bearing portions of the drum 10 for removing any excess developing powder that may adhere to the photoconductive surface. As shown in section in FIG. 4, the magnetic element 100 includes a magnetic core material 102 having its poles formed on opposite longitudinal sides by pole faces 103 and 104 formed of highly magnetic material such as mild steel. These pole faces extend beyond the core material 102 at the end adjacent the drum 10 in order to form a magnetic couple concentrating the magnetic field in a manner similar to a horseshoe magnet. A plastic filler material 106 having non-magnetic properties is fitted between the extended portions of the pole faces and thus a smooth surface faces the drum.

As shown in FIG. 1, the magnetic element 100 is movable upon start-up of the apparatus into a first position placing the end forming the magnetic couple adjacent the photoconductive surface for attracting excess developing powder. Upon completion of a run of copies, the magnetic element is movable into a more horizontal position abutting its other end up against a highly magnetic shunt 108 bridging the rear ends of the pole faces 103 and 104. The magnetic field of the magnetic element 100 is thus concentrated in the shunt 108 to reduce the field strength at the end holding the excess developing powder. Consequently, the excess developing powder falls by gravity into the lower regions of the reservoir 80.

An important part of the present invention, is the transfer station where a copy sheet is brought into contact with the visible powder image formed on the photoconductive surface to lift the powder image thereof and carry it away on the copy sheet. Since the electrostatic latent image may be re-cycled to form another copy during return of the scanning mechanism, it is quite important that the visible powder image be transferred to the copy sheet with minimal adverse effects to the remaining electrostatic latent image.

To these ends, a transfer roller 26 is provided to rotate adjacent the drum 10 in synchronism therewith. The roller 26 is approximately equal in size to the drum 10 and thus makes one revolution for each revolution of the drum. As shown in FIG. 1, the roller 26 includes holes 110 extending inwardly and preferably having a diameter no greater than $\frac{1}{8}$ in. The holes 110 extend along a line parallel to the axis of the roller and are connected to a source of low pressure to grasp the leading edge of a copy sheet positioned by foam roller 112, and bring it into registry with the visible image. The copy sheet is then released from the roller 26 by a higher pressure exerted through the holes 110.

In the embodiment of the transfer roller shown in FIG. 1, the roller is formed of a shell 114 rotatable about a first chamber 116 and a second chamber 117 located adjacent the downstream end of the first chamber. The first chamber 116 is connected to a suitable source of low pressure, and the second chamber 117 is connected to a suitable source of high pressure. In this way, the leading edge of the copy sheet is held against the holes 110 during their travel over the first chamber 116 and then released forcibly as the holes travel over the second chamber 117.

In a second embodiment of the transfer roller shown in FIGS. 6 and 7, the low and high pressure are formed by the rotation of the roller itself, and complicated seals and external pressure sources are not needed.

As shown in FIG. 6, an inner wall 120 formed of a resilient material is held along the inner surface of the outer wall 121 of the roller. One end 122 of the inner wall is held to the outer wall 121 by suitable means such as by welding, and the other end has a cam follower 124 fixed thereto. The cam follower 124 extends through a slot 126 formed in an end wall 128 of the roller and rides along a cam surface 130 fixed exteriorly of the roller. The cam surfacer 130 is shaped so as to move the cam follower radially inwards away from the outer wall of the roller when the copy sheet registers with the holes 110 in the roller. These holes are preferably formed adjacent the free end of the inner wall which has an extensible member 132 extending between this free end of the inner wall and the outer wall 121. Consequently, the space 134 between the inner wall 120 and outer wall 121 is increased to create a low pressure adjacent the holes 110, and the cam surface later allows the cam follower to move back towards the outer wall to decrease the space 134 and create a higher pressure releasing the copy sheet.

Preferably, the cam surface 130 is configured to increase the space 134 further as the copy sheet is transported by the roller. In this way, the low pressure in the space 134 will be maintained even if some air should leak through or around the copy sheet. Further, as shown in FIG. 6, the inner wall 120 tapers towards its fixed end to increase its resilience and allow the cam follower to return towards the outer wall 121 with a snap action to forcibly release the copy sheet.

The roller is preferably made of a material soft enough so as not to damage the photoconductive surface and also should be conductive enough to allow a potential to be applied to the roller to assist in transfer of the powder image to the copy sheet. Conductive rubber having a resistivity of $10^6 \Omega \text{cm}$ to about $10^{10} \Omega \text{cm}$ would be satisfactory.

Further, the roller is contacted by a cleaning brush 140 connected to a vacuum source to keep its surface clean.

As described above, the apparatus of the present invention can quite efficiently produce multiple copies of the same original by preserving the electrostatic latent image for at least two cycles of the photoconductor. Consequently, the apparatus of the cleaning station, and the quenching lamp 54 and neutralizing charger 56, would be activated only after no further copies are to be produced from the existing electrostatic latent image.

The apparatus of the present invention have been described with reference to particular embodiments thereof. It is understood, however, that the present invention could be practised in other forms within the scope of the appended claims.

What is claimed is:

1. An electrophotographic copying apparatus including a photosensitive surface movable cyclically past a plurality of processing stations for forming a copy of an original, said photosensitive surface being adapted to retain for two cycles thereof an electrostatic latent image formed thereon by exposing charged portions of said surface to a light image of the original, and means for scanning the original with light synchronously with movement of said surface to form said light image, said scanning means including a carriage mounted slidably within the apparatus and having a slotway extending vertically, a pin held within said slotway and a flexible cable held to said pin and arranged in an endless path extending along the location of said original document whereby movement of said cable can move said carriage along said original for scanning during one cycle of said photosensitive surface for forming a copy of said original and reverse direction of said carriage smoothly to return it to its initial position during formation of another copy of said original in the next cycle of said photosensitive surface, said carriage including a second slotway for holding a second pin held to a second flexible cable arranged in a second endless path extending along the location of said original a distance longer than said first mentioned path and moving at a speed faster than said first mentioned cable, and means for selectively engaging either said first mentioned pin or said second pin in its respective slotway for changing the speed and length of travel of said scanning means for producing a copy from a larger original.

* * * * *